March 11, 1958     J. E. McBURNEY ET AL     2,826,289
ARTICLE TRANSFER MEANS
Filed Nov. 30, 1954     3 Sheets-Sheet 1
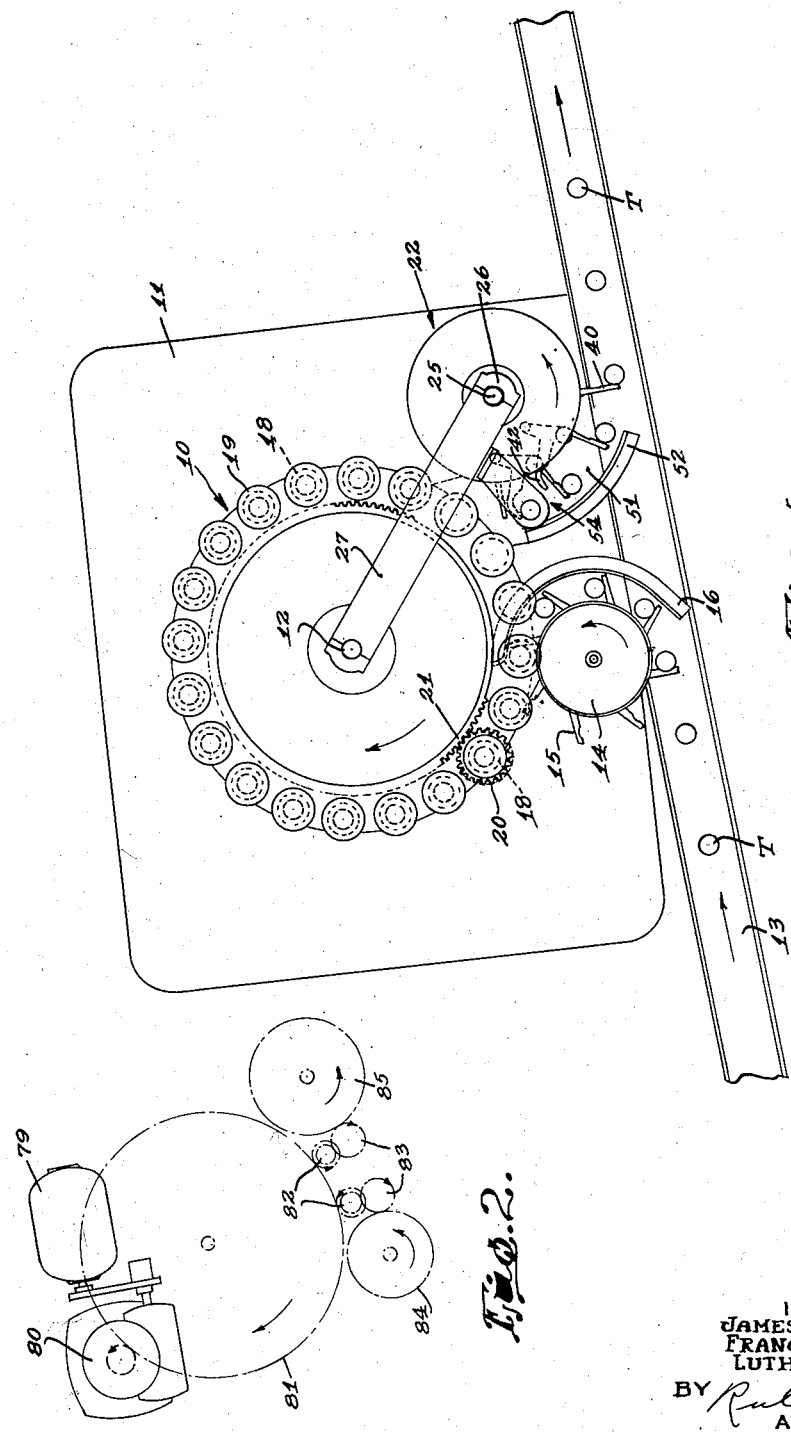
INVENTORS
JAMES E. McBURNEY
FRANCIS S. WRIGHT
LUTHER H. WIDEMAN
BY Rule & Hoge
ATTORNEYS

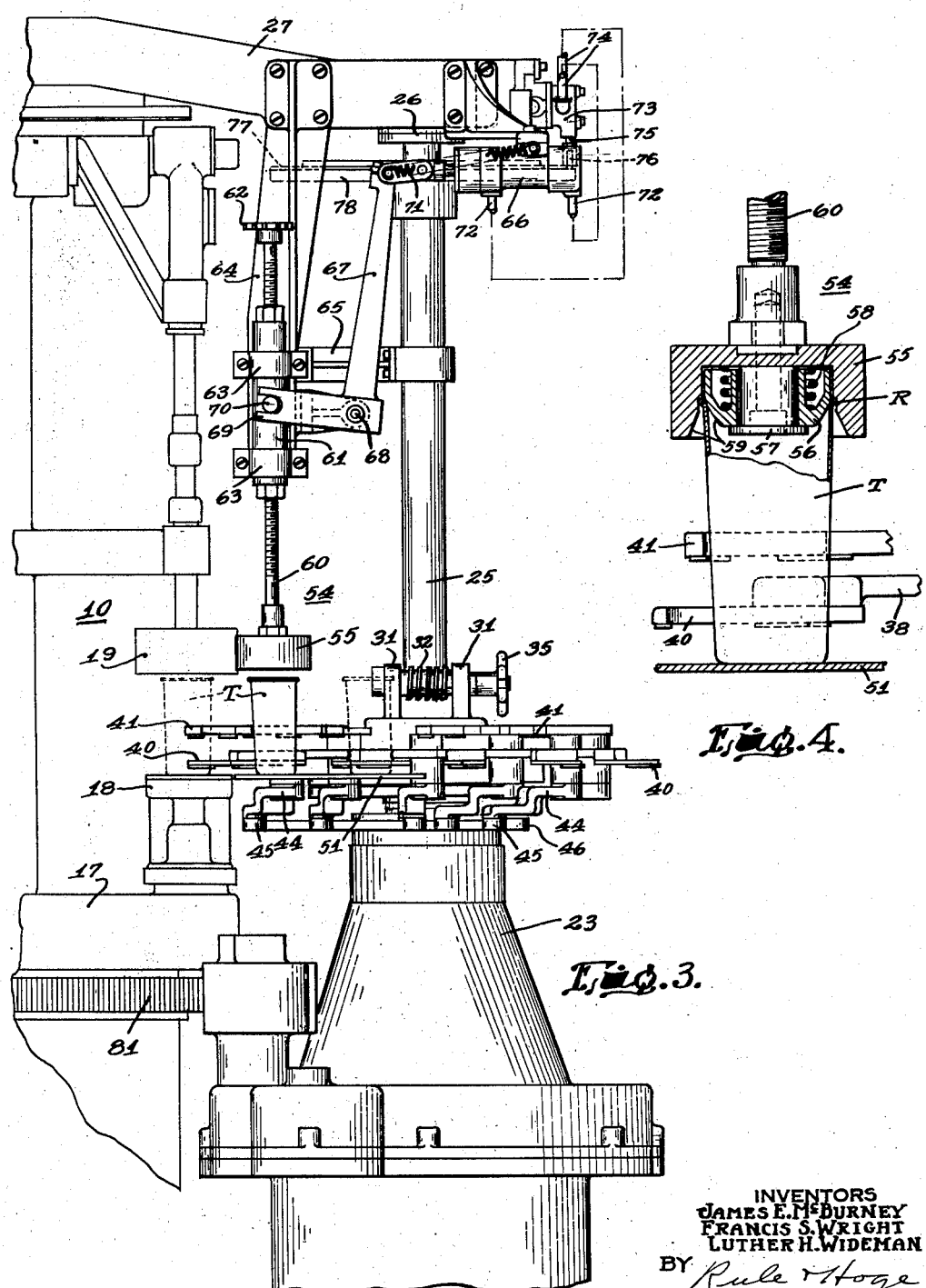

March 11, 1958   J. E. McBURNEY ET AL   2,826,289
ARTICLE TRANSFER MEANS

Filed Nov. 30, 1954   3 Sheets-Sheet 3

INVENTORS
JAMES E. McBURNEY
FRANCIS S. WRIGHT
LUTHER H. WIDEMAN
BY
ATTORNEYS

United States Patent Office 2,826,289
Patented Mar. 11, 1958

2,826,289

ARTICLE TRANSFER MEANS

James E. McBurney, Francis S. Wright, and Luther H. Wideman, Alton, Ill., assignors to Owens-Illinois Glass Company, a corporation of Ohio Application November 30, 1954, Serial No. 471,963

2 Claims. (Cl. 198—22)

The present invention is a novel apparatus for reshaping the rim portions of formed glass articles such for example as tumblers and jars.

In the commercial production of tumblers and jars of certain types, the cylindrical wall which defines the mouth opening, ordinarily is subjected to a so-called "fire-finishing" or "fire-polishing" operation which is intended to smooth out and in some instances, completely obliterate surface imperfections. Frequently the intense heat of the applied flame tends to soften and distort the glass and very often the distortion is of such degree that the article cannot accommodate a sealing cover or cap. In the production of packer's tumblers, for example, the beaded edge or rim, at the mouth of the article, may very easily be sufficiently out of shape that a cap cannot be secured thereon to provide a hermetic seal.

An object of our invention is the provision of novel apparatus which is located in close proximity to the point at which the fire-polishing or fire-finishing operation terminates, to reshape and properly size the beaded rim, or wall, of the tumbler or other such container.

Another object of our invention is the placement of the sizing device in such relationship to the fire-polishing apparatus that the residual heat in the glass from the fire-polishing operation will have maintained the glass sufficiently soft and workable to permit the sizing unit to effectively and very easily reshape and size the rim which defines the mouth opening.

A further object is the provision of novel and effective means for removing the articles from the fire-polishing apparatus and momentarily holding them at a sizing station and thereafter removing the articles to a conveyor for transfer to an annealing lehr.

Other objects will be in part apparent and in part pointed out hereinafter.

In the drawings:

Fig. 1 is a more or less diagrammatic plan view of a fire-polishing apparatus coupled with the sizing device and ware handling equipment;

Fig. 2 is a view diagrammatically illustrating the driving means for the various elements;

Fig. 3 is a side elevational view of the sizing apparatus, glass transferring device, and at the left side, one head of the fire-polishing machine;

Fig. 4 is a fragmentary sectional elevational view showing the sizing head operatively positioned upon a tumbler;

Figure 5:
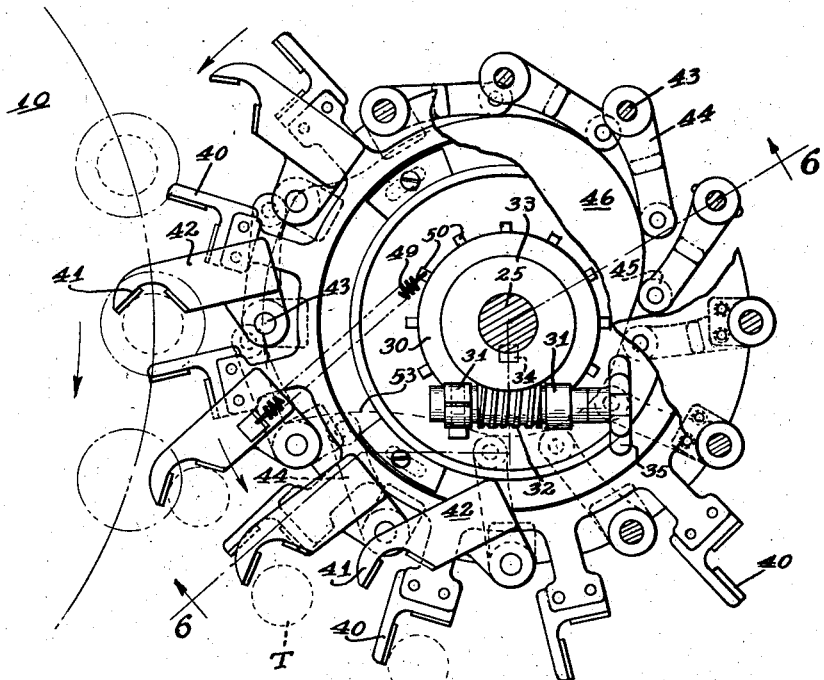
Fig. 5 is a plan view with parts broken away at several elevations showing the article transferring unit or mechanism.

In the illustrated embodiment of our invention we have shown packer's tumblers T as the specific articles undergoing treatment, such tumblers as shown in Fig. 4, including a beaded rim R, or mouth, which is intended to accommodate a closure or cap (not shown) in effecting hermetic sealing of the container.

The fire-polishing unit 10 (Figs. 1, 3, and 5) is mounted upon a base 11 for rotation about a vertical axis 12, this unit being positioned at one side of a horizontal machine conveyor 13 which functions to bring the tumblers T from the forming machine (not shown) to a point in proximity to the fire-polishing unit, and later to transfer the sized articles to an annealing lehr (not shown). A continuously rotating starwheel 14 including a multiplicity of radial fingers 15, operates to transfer the tumblers in succession from the conveyor 13 to the fire-polishing apparatus 10. A guide rail 16 assists the starwheel in directing the tumblers to the fire-polisher.

Although other specific forms of fire-polishing apparatus may be employed, we have, for the purpose of illustration, shown it to consist of a turret 17 carrying an annular series of supporting pads 18, above each of which is a burner 19, the latter designed to apply an intensely hot flame to the rim portion of the tumbler and thereby effect the so-called fire-polishing or fire-finishing operation. As indicated in Fig. 1, each of these tumbler supporting pads 18 carries a pinion 20 which runs in mesh with a ring gear 21, the latter being stationary and functioning to impart rotation to the supporting pads for a distance of approximately 300° about the axis of rotation of the fire-polishing units. At a point just ahead of that at which the tumblers are to be removed from the fire-polishing unit, by the transfer or take-out mechanism 22, the ring gear 21 is terminated so that the tumblers will not be rotating at the time the transfer mechanism engages them.

The transfer mechanism and sizing unit, as best shown in Fig. 3, are positioned between the fire-polishing unit and the horizontal conveyor so that tumblers may be removed by the transfer mechanism one at a time, momentarily positioned at the sizing or reshaping station, and immediately thereafter, pushed onto the conveyor 13.

The transfer mechanism (Figs. 5 and 6) comprises a base 23 having a bearing 24 at its upper end in which a vertical drive shaft 25 is journaled, said shaft extending upwardly from the bearing and journaled at its upper end in a bearing 26 at one end of a tie bar 27, the latter extending horizontally to the axis of the fire-polishing unit 10 where it is suitably connected to the upper end of a shaft at the axis 12 of said unit.

Immediately above the lower bearing 24, the transfer unit is mounted upon and for rotation with the shaft 25. This unit includes two vertically spaced sets of fingers designed for engagement with the tumblers and operating to push the latter, one at a time, to a sizing station and later from said sizing station to the conveyor 13. These fingers rotate with the shaft and to this end the specific structure is substantially as follows.

A disk 28 (Fig. 6) is formed with a hub 29 which is mounted upon the shaft 25 and at its upper end is secured to a cap member 30, the latter formed with a pair of bearings 31 in which a worm 32 is journaled, the latter running in mesh with a worm gear 33 which is secured to the shaft 25 by means of a key 34. A hand wheel 35 is secured to one end of the worm 32 so that when necessary, the angular position of the worm, cap member 30, hub 29 and disk 28 may be adjusted as a unit in relation to the worm gear 30 and shaft 25. The disk 28 is provided in proximity to its periphery with several upwardly opening recesses 36 (one being shown in Fig. 6) intended to receive spring-pressed detents 37 mounted in the finger carrier 38. This carrier includes a hub 39 telescoped over the aforementioned hub 29 upon which it is free to rotate, except for the presence of the locking detents 37. These detents, as will be understood, function as a slip friction clutch and under certain abnormal conditions, the disk 38 and elements fixed thereto, may rotate with the shaft relative to the finger carrier 38.

As explained above, the article transfer fingers or pushers are arranged in two spaced apart annular series. The fingers 40 of one series are rigidly attached to the carrier 38 and separably connected thereto at points spaced apart uniformly about the carrier 38. These are the fingers, which, as will be apparent hereinafter, function solely to transfer the articles from the sizing station to the conveyor 13. Immediately above these rigid fingers 40 is a second annular series of fingers 41, each of these fingers comprising a generally L-shaped holder 42 pivoted to a vertical hinge pin 43 mounted upon said carrier 38 between a pair of the rigid fingers. An arm 44 is secured to the lower end of the hinge pin 43 and carries at its free end a cam roll 45 which rides upon a stationary cam 46, the latter being mounted upon the upper end of the base 23 in such fashion that it can be shifted circumferentially by means of a worm 47 and worm gear 48. Each of these pivoted fingers 41 is connected by means of a coil spring 49 to a finger 50 in proximity to the hub 39 and in such fashion that this spring functions to hold the corresponding cam roll 45 in contact with the face of the cam 46 at all times. Thus, as the carrier 38 rotates, the cam 46 will rock the arms 44 about the pivot pins 43 and thereby advance or retard the fingers 41 in relation to the stationary fingers 40.

Figure 6:
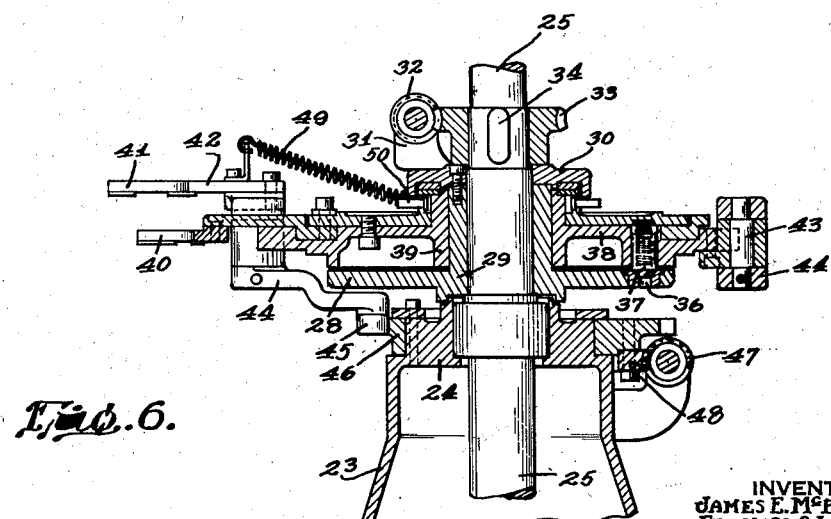
Fig. 6 is a sectional view taken substantially along the line 6—6 of Fig. 5.

By reference to Figs. 5 and 6 it will be apparent that as the transfer unit rotates in a counter-clockwise direction, the cam 46 advances the pivoted fingers in relation to the corresponding rigid fingers 40 so that said pivoted fingers engage the tumblers, or such articles, at the end of the fire-polishing operation and push them one at a time onto a stationary plate 51 (Fig. 3) at the sizing station. A guard rail 52 (Fig. 1) insures against excessive displacement of the tumblers as they are pushed along the plate 51 to the conveyor 13. A reentrant portion 53 in the stationary cam 46 functions to retard the positions of the pivoted fingers 41 so that the article engaging surface thereof will remain stationary for a predetermined period of time, permitting the tumblers to come to rest momentarily at the sizing station. During the time these pivoted fingers remain stationary at the sizing station, the rigid fingers 40 are advancing with the carrier 38 and at such speed in relation to other operations that they engage the articles immediately upon completion of the sizing or reshaping and transfer them to the conveyor 13.

The sizing unit 54 comprises an external cup-like die member 55 and an internal die member 56, the latter mounted upon an axial support 57 and yieldingly held in its lowermost position by means of a coil spring 58. These die members are formed with converging surfaces 59 which accurately center and reshape the rim portion R to the two predetermined dimensions. This sizing unit 54 is operated quite rapidly and necessarily so because of the very short period of time during which the article can be held stationary on the plate 51 if satisfactory production speeds are to be maintained. The mechanism for effecting reciprocation of the unit comprises a vertical supporting rod 60 (Figs. 3 and 4) threaded through a sleeve 61 and carrying an adjusting hand wheel 62 by means of which the lowermost position of the die members can be regulably controlled as required by the height of the tumblers or other articles being worked upon. This sleeve 61 is slidable vertically in guides 63 which are mounted upon a bracket 64 depending from the aforementioned tie bar 27. This bracket is also connected to the vertical shaft 25 by means of a tie bar 65. The sleeve 61 and rod 60, together with the sizing die, are reciprocated vertically by means of an air motor 66 which is suitably connected to the upper end of a bell crank lever 67, the latter being pivoted to a horizontal hinge pin 68 and having fingers 69 engaging pins 70 on the aforementioned sleeve 61. A coil spring 71 aids in lifting the shaping die and supporting elements therefor and holding them in their uppermost position. Air under pressure is supplied to the ends of the air motor 66 through pipes 72, said pipes leading to a conventional Schrader three-way type of reversing valve 73 which in turn is connected by pipes 74 to a source of supply of air under pressure (not shown).

The valve includes a stem portion 75 (Fig. 3) and roller 76 carried thereby, the latter being moved upwardly to open the valve at regular intervals, by means of bars 77 which are positioned on the upper side of a rotary disk 78, the latter being secured to an upper portion of the shaft 25. These bars 77 are spaced apart uniformly about the circumference of the disk 78 and properly positioned in relation to the fingers of the transfer unit so that the sizing device will be lowered into engagement with a tumbler, or such article immediately upon the latter being brought to the sizing station on the supporting plate 51.

In Fig. 2 we have diagrammatically illustrated the drive which includes a motor 79 operating through a speed-reducing unit 80 to drive a ring gear 81 (Figs. 2 and 3) the latter running in mesh with a pair of pinions 82 which in turn drive gears 83. One of these gears is in mesh with a gear 84 which rotates the infeed starwheel 14 while the other gear 83 drives a larger gear 85 suitably connected to the article transfer unit 22.

It is believed to be apparent from the foregoing that tumblers, for example, after having been fire-polished, are transferred from the pads 18 to the plate 51 by means of the pivoted fingers 41 and that upon arriving at the sizing or reshaping station, these pivoted fingers cease momentarily to advance with the carrier 38. Owing to the fact that these pivoted fingers are already positioned well ahead of the corresponding rigid fingers 40, the articles will remain stationary on the plate 51 until the proper rigid fingers advance sufficiently to come in contact with the articles. During this time interval the sizing unit is actuated to reshape the still pliable glass in the rim portion R. Immediately thereafter the rigid fingers move the articles away from the sizing station as explained heretofore.

Modifications may be resorted to within the spirit and scope of the appended claims.

We claim:

1. In apparatus of the character described, automatic means for removing articles from a fire-polishing unit and placing them in upright position at a sizing station, said means comprising an annular series of radial outwardly extending fingers mounted for rotation about a vertical axis, each finger being pivoted for horizontal swinging motion, means including a cam for moving the fingers forwardly about their pivots in a sector of their path of travel about said axis and holding them in such position during transfer of articles from the fire-polishing unit to the sizing station, said cam shaped to cause retarding movement of the fingers when the articles reach the sizing station whereby said articles momentarily remain stationary at the sizing station, and an annular series of rigid radial fingers disposed in a plane below the pivoted fingers and mounted for rotation about said vertical axis, said rigid fingers being brought into engagement with the articles at a predetermined time following completion of the retarding movement of the pivoted fingers.

2. In apparatus of the character described, article transferring means comprising a rotatable vertical shaft, a finger carrier freely rotatable on said shaft, a disk mounted upon and positively driven by said shaft, spring detents providing separable driving connection between said carrier and disk, a plurality of rigid radial fingers mounted upon the peripheral portions of said carrier, a plurality of horizontally swingable fingers arranged above the rigid fingers and mounted on vertical pivots between said rigid fingers, a stationary cam below said disk, arms individual to the pivoted fingers and carrying cam rolls engaging the face of said cam, spring means for holding the rolls in contact with the cam, said cam being shaped to swing the pivoted fingers generally circumferentially of the carrier relative to the rigid fingers and means for adjusting the position of the cam about the axis of rotation of said fingers whereby to predetermine the points at which the pivoted fingers are moved in relation to said rigid fingers.

References Cited in the file of this patent

UNITED STATES PATENTS

| | | |
|---|---|---|
| 1,116,406 | Fleischer | Nov. 10, 1914 |
| 1,638,620 | Cornwell et al. | Aug. 9, 1927 |
| 1,930,746 | Freese | Oct. 17, 1933 |
| 2,073,144 | Darrah | Mar. 9, 1937 |
| 2,112,119 | Rowe | Mar. 22, 1938 |
| 2,555,227 | Emerson | May 29, 1951 |
| 2,624,440 | Hornberger | Jan. 6, 1953 |